(12) United States Patent
Rönneke et al.

(10) Patent No.: US 9,392,634 B2
(45) Date of Patent: Jul. 12, 2016

(54) NODE AND METHOD FOR CONNECTION RE-ESTABLISHMENT

(71) Applicant: Telefonaktiebolaget L M Ericsson (publ), Stockholm (SE)

(72) Inventors: Hans Rönneke, Kungsbacka (SE); Yong Yang, Mölndal (SE); Peter Hedman, Helsingborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 449 days.

(21) Appl. No.: 13/867,146

(22) Filed: Apr. 22, 2013

(65) Prior Publication Data

US 2014/0050160 A1 Feb. 20, 2014

Related U.S. Application Data

(60) Provisional application No. 61/683,222, filed on Aug. 15, 2012.

(51) Int. Cl.
*H04W 76/02* (2009.01)
*H04W 8/04* (2009.01)
*H04W 4/00* (2009.01)
*H04W 76/04* (2009.01)

(52) U.S. Cl.
CPC ............ *H04W 76/028* (2013.01); *H04W 4/005* (2013.01); *H04W 8/04* (2013.01); *H04W 76/022* (2013.01); *H04W 76/048* (2013.01)

(58) Field of Classification Search
None
See application file for complete search history.

(56) References Cited

U.S. PATENT DOCUMENTS

| 2004/0240449 | A1 | 12/2004 | Su | |
| 2012/0172066 | A1* | 7/2012 | Okabe et al. | 455/458 |
| 2012/0275430 | A1* | 11/2012 | Wang et al. | 370/331 |
| 2014/0050132 | A1* | 2/2014 | Ronneke et al. | 370/310 |
| 2014/0050199 | A1* | 2/2014 | Chen et al. | 370/331 |

FOREIGN PATENT DOCUMENTS

| WO | 2004010721 A1 | 1/2004 |
| WO | 2005043860 A1 | 5/2005 |
| WO | 2007117461 A2 | 10/2007 |

OTHER PUBLICATIONS

Notification of Transmittal of the International Search Report and the Written Opinion of the International Searching Authority dated Oct. 7, 2013, in International Application No. PCT/EP2013/064141, 10 pages.

* cited by examiner

*Primary Examiner* — Marcus R Smith
(74) *Attorney, Agent, or Firm* — Rothwell, Figg, Ernst & Manbeck, P.C.

(57) ABSTRACT

In some instances, a terminal device may communication with the network infrequently. Therefore, in order to save system resources, a PDN or PDP connection associated with the terminal device may be revoked or deleted. Example embodiments presented herein are directed towards a gateway node and mobility management node for providing an improved means of re-establishing a previously revoked or deleted PDP/PDN connection in response to a downlink data notification.

10 Claims, 9 Drawing Sheets

NODE AND METHOD FOR CONNECTION RE-ESTABLISHMENT

RELATED APPLICATIONS

This application claims the benefit of U.S. Provisional Application No. 61/683,222, filed on Aug. 15, 2012. The entire teachings of the above application are incorporated herein by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

SUMMARY

In some instances, a terminal device may communicate with the network infrequently. Therefore, in order to save system resources, a PDN or PDP connection associated with the terminal device may be revoked or deleted. However, a problem exists when an external server (e.g., SCS) tries to communicate with a terminal device (e.g., a M2M device) with a deleted PDN Connection. The external server will first need to send a few packets and have a transmission failure before the external server understands that it needs to send a Device Trigger for the PDN connection to be re-established. The SCS can also be notified by signaling when a PDN connection is deleted, but such a solution requires extensive signaling. Furthermore, both solutions require signaling before IP communication can commence.

Thus, at least one example object of some of the example embodiments presented herein is to provide a method for re-establishing a PDN/PDP connection which was previously revoked. One example advantage of the example embodiments presented herein is that the deletion and re-establishment of the PDN/PDP connection may be internal to the core network of the 3GPP system. Specifically, the external AS/SCS need not be aware that a 3GPP PDN/PDP connection has been deleted to save network resources. As the IP address of the PDN/PDP connection may be kept reserved, the AS/SCS may use the terminal devices IP address it already has and just start to communicate with the terminal device. Thus, the 3GPP system may re-establish the PDN/PDP connection completely transparently to the AS/SCS.

If the terminal device begins to communicate with the AS/SCS (e.g., UL/mobile originated MO), the mobility management node (e.g., MME, S4-SGSN or SGSN) may also transparently re-establish the PDN/PDP connection in the core network when the terminal device sends a service request. Therefore, another example advantage is that the terminal device is also unaware of the deleted PDN/PDP connection and keeps the IP address it receives when the PDN/PDP connection was initially established. A further example advantage is that the SCS/AS does not need to signal to re-establish the PDN/PDP connection to the terminal device. Furthermore, the response time is kept to a minimum for MT communication.

Thus, according to some of the example embodiments, a method, in a gateway node (e.g., PGW or GGSN), for re-establishing a revoked PDP/PDN connection is presented. The gateway node is comprised in a wireless network (e.g., a GERAN, UTRAN or E-UTRAN based system). The method comprises receiving, from an application server, a data packet, where data packet comprises an IP address of an intended destination. The method also comprises determining that a PDP/PDN connection between the gateway node and the intended destination is revoked. The method further comprises retrieving an identification of a terminal device, or a PDP/PDN connection, associated with the IP address of the intended destination. The method also comprises sending, to the mobility management node (e.g., MME, S4-SGSN or SGSN), a re-establishment notification to re-establish the revoked PDP/PDN connection.

Some of the example embodiments are directed towards a gateway node for re-establishing a revoked PDP/PDN connection. The gateway node is comprised in a wireless network. The gateway node comprises interface circuitry configured to receive, from an application server, a data packet, where the data packet comprises an IP address of an intended destination. The gateway node further comprises processing circuitry configured to determine that a PDP/PDN connection between the gateway node and the intended destination is revoked. The processing circuitry is further configured to retrieve an identification of a terminal device, or a PDP/PDN connection, associated with the IP address of the intended destination. The interface circuitry is configured to send, to the mobility management node, a re-establishment notification to re-establish the revoked PDP/PDN connection.

Some of the example embodiments are directed towards a method, in a mobility management node, for re-establishing a revoked PDP/PDN connection. The method comprises receiving, from a gateway node, a re-establishment notification, where the re-establishment notification comprises an identification of a terminal device, or a PDP/PDN connection, associated with an IP address of an intended destination of an IP packet. The method further comprises confirming an existence of the revoked PDP/PDN connection. The method also comprises sending, to the gateway node or the terminal device, a re-establishment request to re-establish the revoked PDP/PDN connection.

Some of the example embodiments are directed towards a mobility management node for re-establishing a revoked PDP/PDN connection. The mobility management node comprises interface circuitry configured to receive, from a gateway node, a re-establishment notification, where the re-establishment notification comprises an identification of a terminal device, or a PDP/PDN connection, associated with an IP address of an intended destination of an IP packet. The mobility management node further comprises processing circuitry configured to confirm an existence of the revoked PDP/PDN connection. The interface circuitry is further configured to send, to the gateway node or the terminal device, a re-establishment request to re-establish the revoked PDP/PDN connection.

DEFINITIONS

3GPP Third Generation Partnership Project
AAA Authentication, Authorization and Accounting
AS Application Server
BSC Base Station Controller
DDN Downlink Data Notification
DL Downlink
DNS Domain Name System
E-UTRAN Evolved UTRAN
EBI EPS Bearer Identity
EMM Evolved Packet System Connection Management
eNB eNodeB
EPC Evolved Packet Core
EPS Evolved Packet System
F-TEID Fully Qualified Tunnel End Point Identifier
GERAN GSM/EDGE Radio Access Network
GGSN Gateway GPRS Support Node
GPRS General Packet Radio Service
GSM Global System for Mobile communications
GTP GPRS Tunneling Protocol
GTP-U GTP-User plane
GTPv2-C GTP version 2-Control plane
HLR Home Location Register
HSS Home Subscriber Server
IEFT Internet Engineering Task Force
IMSI International Mobile Subscriber Identity
IP Internet Protocol
IWF InterWorking Function
LTE Long Term Evolution
M2M Machine-to-Machine
MM Mobility Management
MME Mobility Management Entity
MO Mobile Originated
MSISDN Mobile Station International Subscriber Directory Number
MT Mobile Terminated
MTC Machine Type Communications
NSAPI Network layer Service Access Point Identifier
NW Network
PCRF Policy Control and Charging Rules Function
PDN Packet Data Network
PDP Packet Data Protocol
PGW PDN Gateway
RAN Radio Access Network
RBS Radio Base Station
RNC Radio Network Controller
SCS Service Capability Server
SGSN Serving GPRS Support Node
SGW Serving Gateway
SMS Short Message Service
SMSC Short Message Service Center
TAU Tracking Area Update
UE User Equipment
UL Uplink
UMTS Universal Mobile Telecommunications Systems
UTRAN UMTS Terrestrial Radio Access Network
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein.

It should be appreciated that all of the example embodiments presented herein may be applicable to a GERAN, UTRAN or E-UTRAN based system. In all explanations and examples provided, a gateway node may be a PGW or GGSN (even if only a PGW or GGSN is cited in the example). Furthermore, a mobility management node may be a MME, SGSN, or a S4-SGSN (even if only a MME is provided in the example). It should also be appreciated that the example embodiments are directed towards re-establishing both a PDP context and PDN connection (even if only a PDP context or PDN connection or PDN/PDP connection is mentioned in the example).

Figure 1:
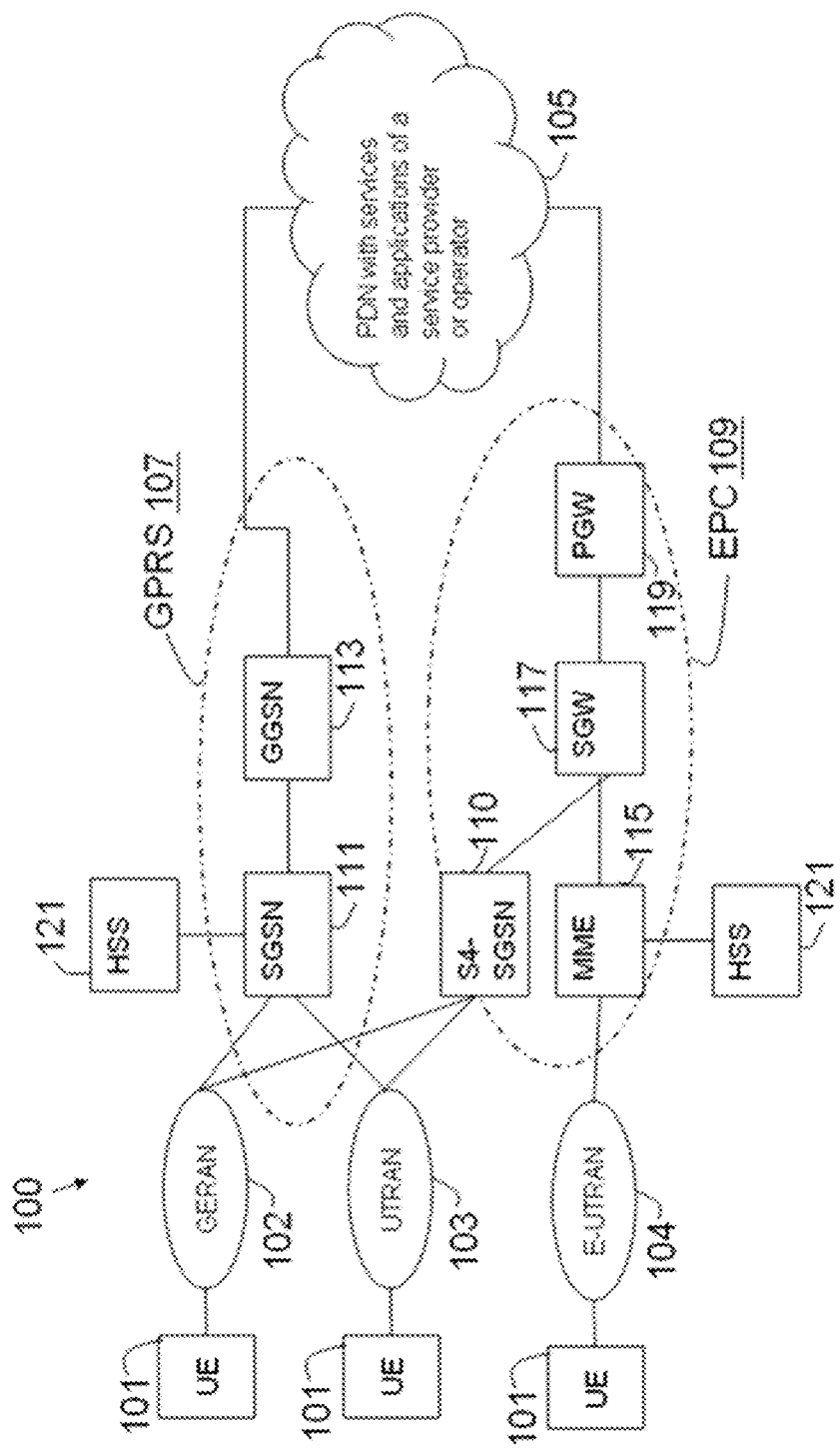
FIGS. 1-3 are illustrative example of wireless communications networks.

In order to provide a better explanation of the example embodiments presented herein, a problem will first be identified and discussed. FIG. 1 provides an example of a communication network 100. As shown in FIG. 1, a user equipment (UE) 101 may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to a server e.g. a SCS of a service provider or an operator or an application server (AS) 105. In gaining access to the SCS or application server 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, and mobility management. The GPRS subsystem 107 may also include a Gateway GPRS Support Node 113, which may be responsible for the interworking between the GPRS subsystem 107 and the SCS or application server 105.

The EPC subsystem 109 may comprise a Mobility Management Entity 115, which may be responsible for idle mode UE tracking, paging procedures, and attachment and activation processes. The EPC subsystem may also comprise a Serving Gateway (SGW) 117, which may be responsible for the routing and forwarding for data packets. The EPC subsystem may also include a Packet data network Gateway (PGW) 119, which may be responsible for providing connectivity from the user equipment 101 to the SCS or application servers 105. Both the SGSN 111 and the MME 115 may be in communication with a Home Subscriber Server (HSS) 121, which may provide device identification information, an International Mobile Subscriber Identity (IMSI), etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

Figure 2:
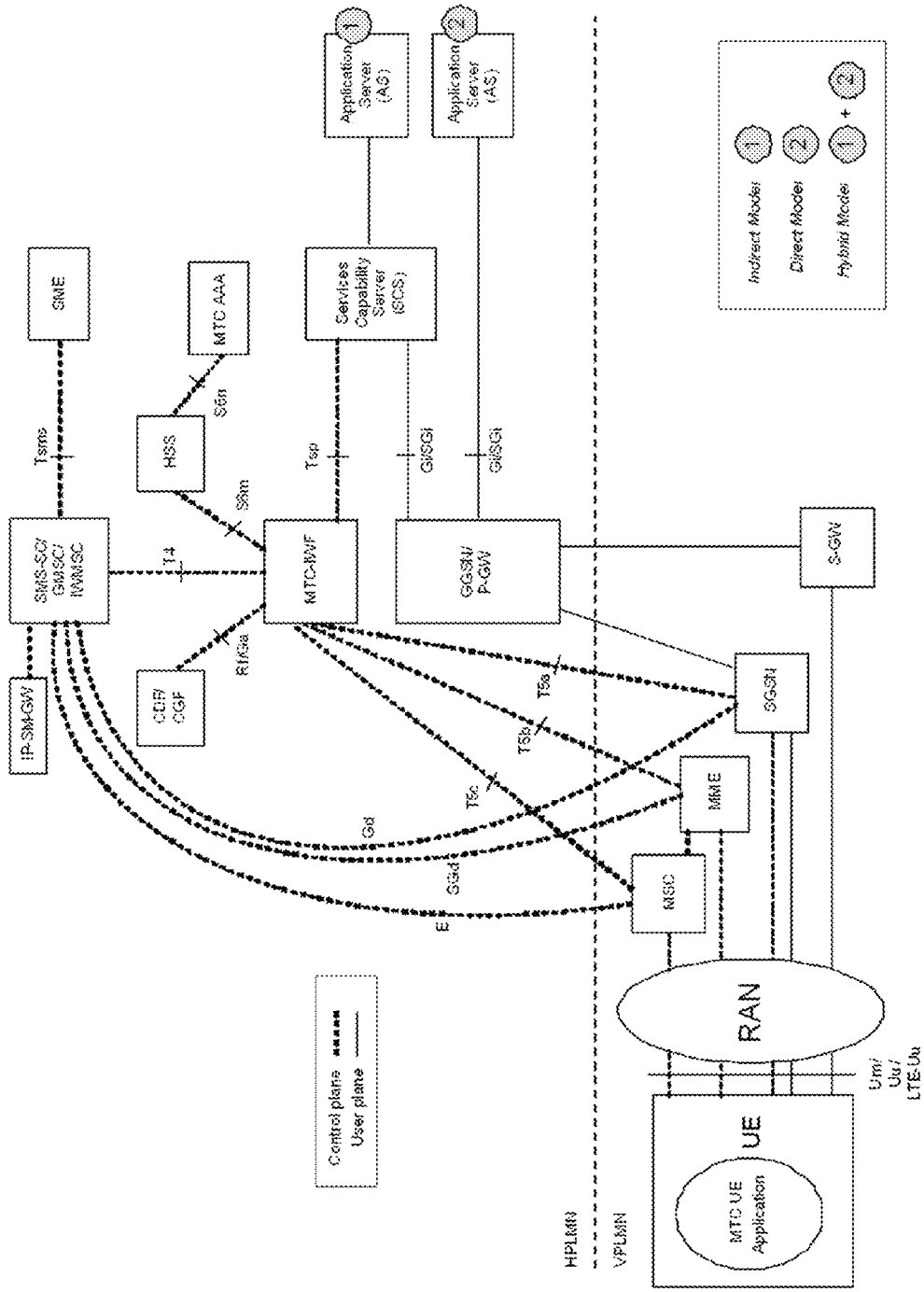

FIG. 2 provides another example representation of a wireless network where the dotted lines represent communication between modules or nodes in the control plane. The continuous lines represent communication in the user plane. FIG. 2 illustrates three example models of an AS communicating and triggering the reestablishment of a revoked PDN/PDP connection.

There is a requirement from operators to reduce the resource usage for devices (e.g., M2M devices or any other terminal device) that only communicate very rarely and stay silent for long periods of time. Furthermore, maintaining the default PDN/PDP connection in networks is seen as a costly resource usage. However, the optimization is of course also needed for devices with more than one (the default) PDN connection.

Such devices may be categorized as "infrequent communication" devices, that is, they only communicate very seldom, for example, one or a few IP packets a week or a month. The number of these types of devices may be large, several times more than the normal type of terminals in the network. Therefore, using normal network procedures for these devices may require a disproportional large amount of network resources and hence optimizations are needed. It has therefore been proposed to delete the PDN/PDP connections when not in use. That would save resources and signaling in the network for the infrequent signaling terminal devices (e.g., M2M devices).

Some operators have suggested establishing the PDN/PDP connection and allocating resources in the PGW and SGW only at the rare occasions when communication from/to these types of devices is actually done. That way no memory resources or other resources are allocated in the PGW and SGW at all, and no mobility (MM) related signaling is required between the MME and SGW/PGW when the devices are moving. By keeping the devices attached (registered) in the network, the devices may be reached in case of mobile terminated (MT) communication, for example, from an SCS/MTC Server or AS.

There are some requirements specified in stage 1 document, TS 22.368, for example, "The system shall provide mechanisms to efficiently maintain connectivity for a large number of MTC Devices" and "MTC Devices may keep their data connection or not keep their data connection when not communicating, depending on operator policies and MTC Application requirements".

When a user equipment is in sleep mode, the user equipment may not be immediately reachable by the network. It would only be reachable when the device wakes up and does some signaling to the network, for example, in conjunction to the periodic tracking area update (TAU) signaling (i.e., the periodic "keep alive" signaling in 3GPP networks). Devices using the user equipment sleep mode state will probably not communicate very often and are likely to be good candidates for belonging to the category of "infrequently communicating" devices.

The problem with infrequently communicating devices in LTE networks is that the LTE standard is defined to use the "always connected" paradigm. That is, an attached LTE device does always have a PDN connection. And that will consume resources and create signaling in the network as described above. Thus, in order to save system resources, the PDN connection may be revoked or disconnected or deleted.

However, problems may arise when an external server (e.g., SCS or AS) tries to communicate with a terminal device (e.g., a M2M device) with a deleted PDN Connection. The external server will first need to send a few packets and have a transmission failure before the external server understands that it needs to send a Device Trigger for the PDN connection to be re-established. The SCS can also be notified by signaling when a PDN connection is deleted or revoked, but such a solution requires extensive signaling. Furthermore, both solutions require signaling before IP communication may commence. Furthermore, for an AS communicating using a direct model (#2 in FIG. 2) with a PGW/GGSN, there is no way to send a Device Trigger in case there is a transmission failure after sending a few packets. That is, an AS cannot trigger a re-establishment of a revoked PDN connection.

Current solutions using the indirect model (#1 in FIG. 2) require signaling to re-establish a PDN/PDP connection for IP communication to be possible. This is especially problematic for down link (DL) traffic (MT traffic) when, for example, an external application server (AS) or a Service Capability Server (SCS) first needs to signal to the mobile network before it may send IP packets to the M2M Device. The Device Trigger function has been developed in Rel-11 to trigger a device to re-establish any missing PDN connection or PDP context.

It is also a problem that if the AS/SCS is unaware that the PDN connection of the M2M Device has been revoked or deleted, it will first try to send some IP packets, without any answer from the M2M Device, before it understands that it needs to send a device trigger to the M2M Device. That takes time and delays the communication.

Thus, according to some of the example embodiments, a method for re-establishing a PDN/PDP connection which was previously revoked is presented. Specifically, according to some of the example embodiments, the re-establishment may be provided as a result of a downlink data notification.

Figure 3:
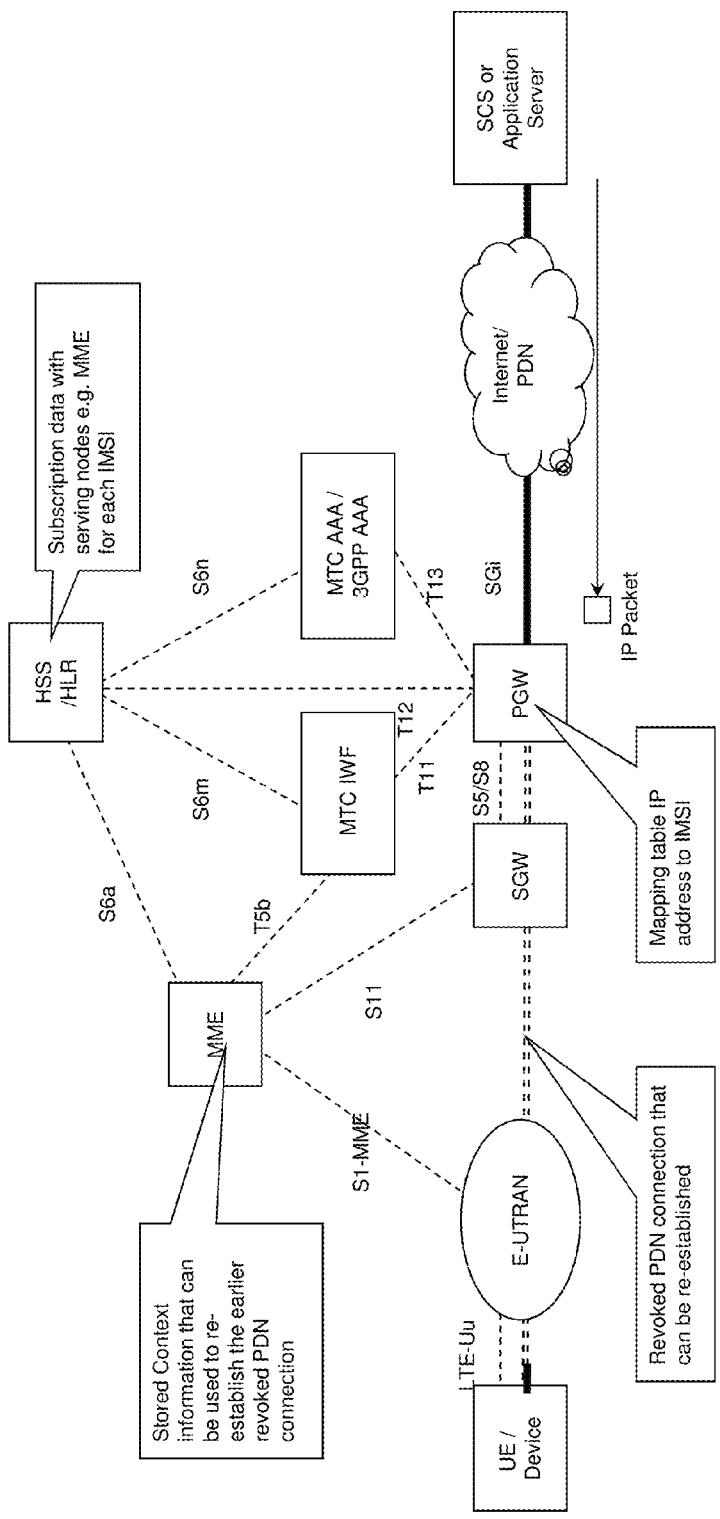

FIG. 3 provides another network example which highlights some of the example embodiments presented herein. Some of the example embodiments presented herein may be directed towards a gateway node re-establishing an earlier existed PDN/PDP connection. The PDN/PDP connection is assumed to have been deleted or revoked.

It should be appreciated that while FIG. 3 solely illustrates a E-UTRAN network, the example embodiments may also be applied to GERAN and UTRAN based systems as well. Thus, according to some of the example embodiments, the gateway node is provided with new functionality relating to E-UTRAN (LTE) access. This new functionality may also be applied to the GERAN and the UTRAN accesses, in which case the "MME" in the description below is replaced with "SGSN" or "S4-SGSN". The term "M2M Device" used in the text below is synonym with "MTC Device" (used in 3GPP specifications). It should also be appreciated that the terms User Equipment (UE) and Mobile Station (MS), as well as terminal device, are synonyms and are also used in 3GPP specifications.

According to some of the example embodiments, the gateway node may store a table with any number of IP address— IMSI pairs for all revoked or deleted PDN/PDP connections. When a DL data packet arrives, for which the destination IP address will have no corresponding GTP tunnel, the gateway node looks in the table using the destination IP address and finds the IMSI for the user equipment. Using the IMSI, the gateway node (e.g., PGW or GGSN) then finds the current serving mobility management node (e.g., MME, S4-SGSN or SGSN) for the IMSI (or associated device) and by new signaling notifies the mobility management node that the PDN/PDP connection between the SGW and the PGW or between the SGSN and the GGSN needs to be re-established. When the PDN/PDP connection has been re-established, the IP packet which has been buffered in the gateway node, is sent to the terminal device (e.g., user equipment or M2M device). This may trigger the terminal device to start to communicate to the sender of the IP packet.

According to some of the example embodiments, the gateway node (e.g., PGW or GGSN) keeps a list of reserved IP addresses for PDN/PDP connections that have been revoked or deleted. According to some of the example embodiments, each reserved IP address in this list may also optionally comprise the address or identity of the latest known serving mobility management node (e.g., MME, S4-SGSN or SGSN) for the terminal device that the IP address belongs to. That mobility management node address or identity may be used for avoiding HSS queries for terminal devices that are less mobile and do not often change mobility management nodes.

According to some of the example embodiments, various methods for finding out which mobility management node is currently serving the terminal device are provided. Since the terminal device, which has a deleted PDN/PDP connection, may be mobile and in some situations move outside the coverage area of a mobility management node, the terminal device may be camping on a different mobility management node when the PDN/PDP connection needs to be re-established because of a DL IP packet that has arrived in at the gateway node. It should be appreciated that the IP packet will always arrive at the same gateway node, since each gateway node has its own range of IP addresses not shared by other gateway nodes. This is how basic IP routing works.

However, there are exceptions to this, for example, where a router (or gateway) may take over the work and the IP addresses of another router in case the first router fails for some reason. In such cases, it is assumed that the list of reserved IP addresses and associated IMSI described above is also taken over as part of the failover to the other router.

According to some of the example embodiments, four non-limiting examples for how the serving mobility management node may be found by the gateway node based on the IMSI associated with an IP address are provided below.

1) Using a direct interface (labeled "T12" in FIG. 2) from the gateway node to the HSS/HLR; or 2) Using a new interface (labeled "T11" in FIG. 2) to the MTC IWF which has an existing interface S6m to the HSS/HLR; or 3) Using a new interface (labeled "T13" in FIG. 2) to the MTC AAA or 3GPP AAA which has an existing interface S6n to the HSS/HLR; or 4) Sending the notification without first finding the serving mobility management node and instead letting an intermediary node find the serving mobility management node. According to some of the example embodiments, the intermediary node may be, for example, the MTC-IWF, the SGW or the HSS/HLR itself.

To avoid doing excessive HSS/HLR queries at each arriving DL packet, the address and/or identity of the latest serving mobility management node may be locally stored in the gateway node or in an intermediate node, for example, the MTC-IWF. The gateway node may then notify the mobility management node immediately without putting a load on the HSS/HLR. For stationary terminal devices, or low mobility devices (e.g., a user equipment that only moves within an MME/SGSN/S4-SGSN pool area, such as electricity meters), such an optimization should work very well. If a mobility management node has been notified based on the locally stored serving mobility management node information, and the notification fails because the terminal device has moved to another mobility management node, according to some of the example embodiments, only then should the gateway node do an HSS query before the notification is repeated to the new mobility management node.

According to some of the example embodiments, once the mobility management node has been identified, the mobility management node may be notified to re-establish the PDN/PDP connection. Since it is the mobility management node that may initiate the re-establishment of a deleted or revoked PDN/PDP connection, the gateway node may notify the mobility management node that the PDN/PDP connection where the DL IP packet has arrived needs to be re-established.

According to some of the example embodiments, the gateway node may either find the serving mobility management node before it sends the notification, or it may let an intermediate node along the notification path find the serving mobility management node. The IMSI of the terminal device for which the PDN/PDP connection(s) is to be re-established is comprised in the notification message and may be used by an intermediate node to query the HSS/HLR. If "finding the serving mobility management node" is based on locally stored or cached information, for example, to avoid excessive HSS/HLR signaling, and the notification to that mobility management node fails, the notified mobility management node shall return an error cause, for example, "user equipment not in this mobility management node", by which the gateway node may understand that the HSS needs to be queried to find up-to-date information about the current serving mobility management node.

According to some of the example embodiments, a few non-limiting examples of possible paths for the notification are:
a) PGW SGW->MME/S4-SGSN
b1) PGW MTC-IWF MME/S4-SGSN
b2) GGSN->MTC-IWF SGSN
c1) PGW MTC-IWF SMSC->MME/S4-SGSN
c2) GGSN->MTC-IWF SMSC->SGSN
d1) PGW MTC-IWF HSS/HLR MME/S4-SGSN
d2) GGSN->MTC-IWF HSS/HLR SGSN
e1) PGW HSS/HLR MME/S4-SGSN
e2) GGSN->HSS/HLR SGSN
f1) PGW MTC AAA->HSS/HLR->MME/S4-SGSN
f2) GGSN->MTC AAA->HSS/HLR->SGSN
g1) PGW MME/S4-SGSN
g2) GGSN->SGSN Alternative a) requires a preceding query of HSS to find the serving MME/S4-SGSN (see example methods 1, 2 and 3 for finding a serving mobility management node as described above). The other alternatives may use a preceding query of the HSS/HLR but may also depend on an intermediary node to find the serving mobility management node (e.g., the MME, S4-SGSN or SGSN). In alternative signaling paths d1), d2), e1), e2), f1) and f2) where the HSS/HLR is in the path, the HSS/HLR may do the query as part of forwarding the notification to the mobility management node (e.g., MME, S4-SGSN or SGSN). The use of alternative path g1) may require a new roaming interface between the gateway node (e.g., PGW) and the mobility management node (e.g., MME).

Example alternative path a) is based on the GTPv2-C protocol as specified 3GPP TS 29.274. Before sending the notification the PGW finds the serving MME through a locally store/cache or through method 1), 2) or 3) as described in the non-limiting examples for finding a mobility management node described above. Existing GTPv2 messages, for example, PGW Downlink Triggering Notification/Acknowledge may be used, otherwise a new pair of GTPv2-C messages may be created.

Figure 4:
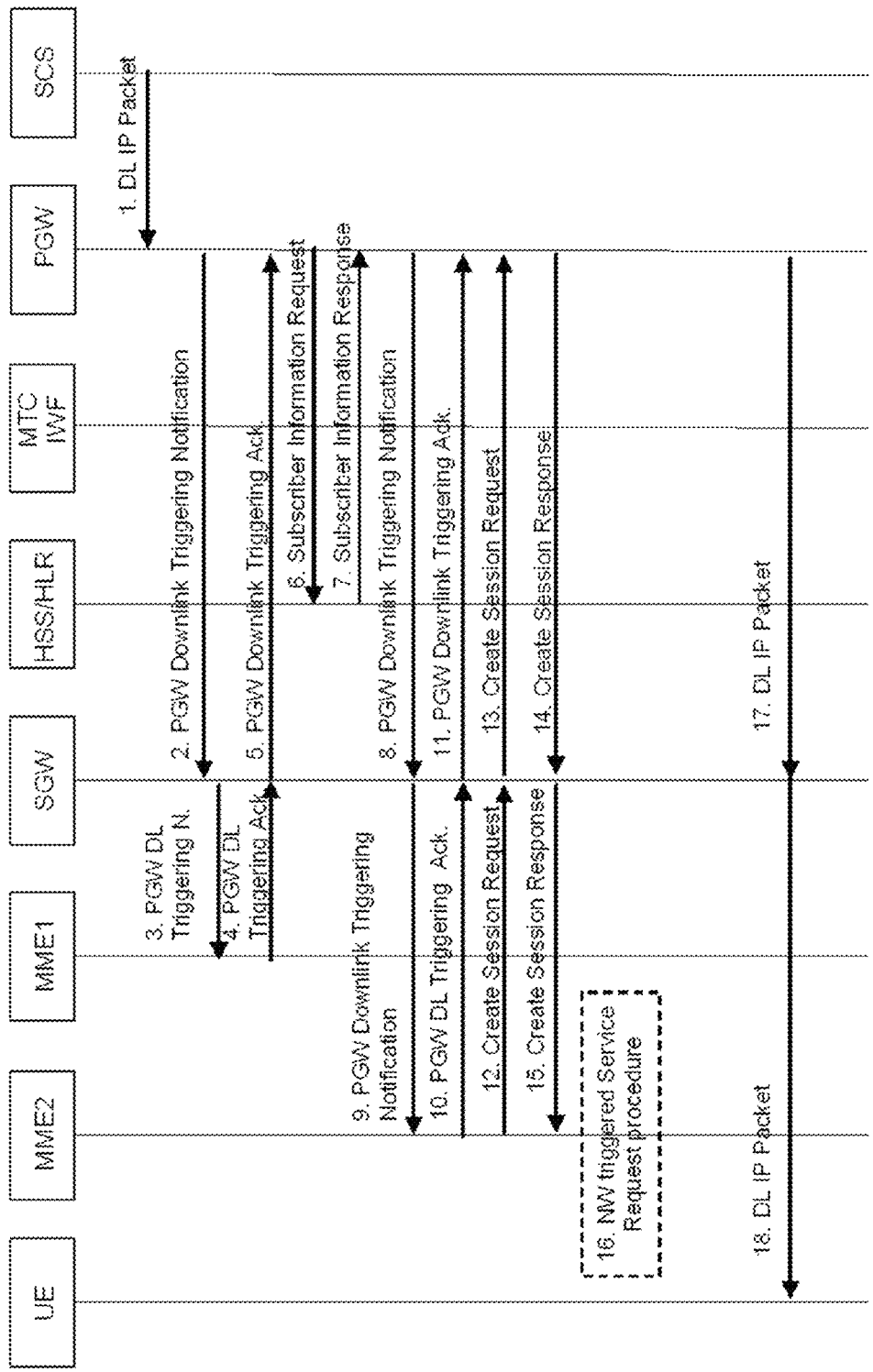
FIGS. 4 and 5 are example messaging diagrams illustrating some of the example embodiments presented herein.

FIG. 4 illustrates an example messaging diagram utilizing some of the example embodiments presented herein. In the example provided in FIG. 4, PGW Downlink Triggering Notification/Acknowledge messages are used. The various messages of FIG. 4 will be described below according to the corresponding message number. It should be appreciated that the example provided in FIG. 4 is with respect to an E-UTRAN based system, however, the example embodiments may also be applied to a GERAN or UTRAN based system.

Message 1

A downlink IP packet arrives in the PGW. The destination IP address does not have any corresponding GTP-U tunnels. The PGW checks the list of reserved IP addresses and finds a match. The IMSI and the latest known MME Identifier associated to the IP address are used to send a PGW Downlink Triggering Notification to the MME, via an SGW, which supports the message. The PGW selects a SGW supporting the message via a local configuration or a capability exchange using a supported feature notification mechanism already specified in the 3GPP specifications.

The PGW may use primarily its cached information about the serving MME to avoid an excessive HSS/HLR load. If the existing message is used, a new indication may be provided to indicate to the SGW/MME to report if the user equipment is controlled by the MME (identified by the comprised MME Identifier) in the PGW Downlink Triggering Notification Acknowledge message. Another new information element may be comprised to indicate what service the received Downlink data belongs to, in order to let the MME perform service aware paging in the later procedure, such service information may be retrieved by the PGW via a packet inspection function.

Message 2

The SGW receives the PGW Downlink Triggering Notification and forwards it to the MME at the MME address comprised in the PGW Downlink Triggering Notification message.

Message 3

The MME receives the PGW Downlink Triggering Notification message. The MME checks if it currently serves the terminal device/user equipment identified by the IMSI in the message. If it does, the sequence proceeds as shown to step/message 9. If the MME is not serving that IMSI, a PGW Downlink Triggering Acknowledge message with a cause code, e.g., "UE not in this MME" is returned.

Message 4

The SGW forwards the PGW Downlink Triggering Acknowledge message to the PGW.

Message 5

If the PGW receives a PGW Downlink Triggering Acknowledge message with an error cause indicating that the user equipment (IMSI) is not served by that MME, for example, "UE not in this MME", or if PGW Downlink Triggering Acknowledge comprises an acceptance cause, for example, downlink triggering request is accepted by the MME and SGW, but there is no signaling messages to re-establish the deleted PDN connection within a configurable timer and the re-try counter has been also expired, the PGW queries the HSS/HLR to find the current serving MME. This query may use any of example methods 1, 2 or 3 for finding a mobility management node as described above. The IMSI is comprised in the Subscriber Information Request.

Message 6

The HSS/HLR receives the SIR and returns with the current serving MME identity.

Message 7

The PGW resolves the MME identity to an MME GTPv2-C address using a DNS server. If this MME is different from the MME in step or message 2, the PGW sends a new DL Data Request to the MME, via a SGW supporting the message by local configuration or by capability exchange using a supported feature notification mechanism already specified in the 3GPP specification. It should be appreciated that the SGW selected by the PGW in this step may be the same or different than the one selected in step/messages 12-15 below by the MME. It is decoupled. In this step the SGW is just a signaling relay.

Message 8

The SGW receives the PGW Downlink Triggering Notification and forwards it to the MME at the MME address comprised in the DL Data Request message.

Message 9

The MME receives the PGW Downlink Triggering Notification message. The MME checks that it currently serves the terminal device/user equipment identified by the IMSI in the message. The MME then triggers a re-establishment procedure (as described in messages 12-15) to re-establish the PDN connection. The MME may also optionally already now trigger a network initiated service request procedure to establish the data path between the SGW and the eNB/UE. Alternatively, that procedure may be triggered in step/message 16 below or when the DL IP packet arrives in the SGW and the SGW sends a Downlink Data Notification to the MME.

Message 10

A PGW Downlink Triggering Acknowledge message is sent back to the PGW via the SGW. Alternatively, the PGW may take the Create Session Request in step/message 13 as an acknowledgement of a successful DL Data Request.

Message 11

SGW forwards the PGW Downlink Triggering Acknowledge to the PGW.

Messages 12-15

The PGW Downlink Triggering Notification message triggers a re-establishment procedure where the MME re-establishes the previously existing PDN connection by sending a Create Session Request comprising the reserved IP address to the same PGW as before. When the PGW receives a Create Session Request with an IMSI or IP address for which it has a reserved IP address (e.g., for a previously deleted PDN connection), it creates the PDN Connection using the reserved IP address. When the PDN connection has been created, a response is sent back to the SGW and MME. In an alternative implementation the MME does not send the IP address in the Create Session Request, where the PGW then instead finds the IP address by looking in its reserved IP address list using the IMSI in the request message.

Message 16

The MME optionally already now triggers a network initiated service request procedure to move the terminal device to an EMM Connected mode, for example, to re-establish the data path from the SGW to the eNB and establish radio bearers to the terminal device. Doing this now may shorten the response time somewhat and save signaling, compared to using the normal DDN procedure in the SGW for triggering, as is discussed in step/message 18 below.

Message 17

The PGW forwards the buffered DL IP packet on the newly created PDN connection towards to the terminal device/UE. This forwarding may optionally be delayed for a short time (milliseconds to seconds) to ensure the PDN connection has been established in all nodes along the path. Especially, if the MME is configured to perform step/message 16 above, this delay can avoid an unnecessary DDN to be sent from SGW to the MME.

Message 18

The SGW forwards the DL packets to the eNB, if the eNB F-TEID for the user plane is already available, for example, the eNB F-TEID may be received in message 16. Otherwise, the SGW sends a Downlink Data Notification to the MME as part of Network Initiated Service Request procedure.

Figure 5:
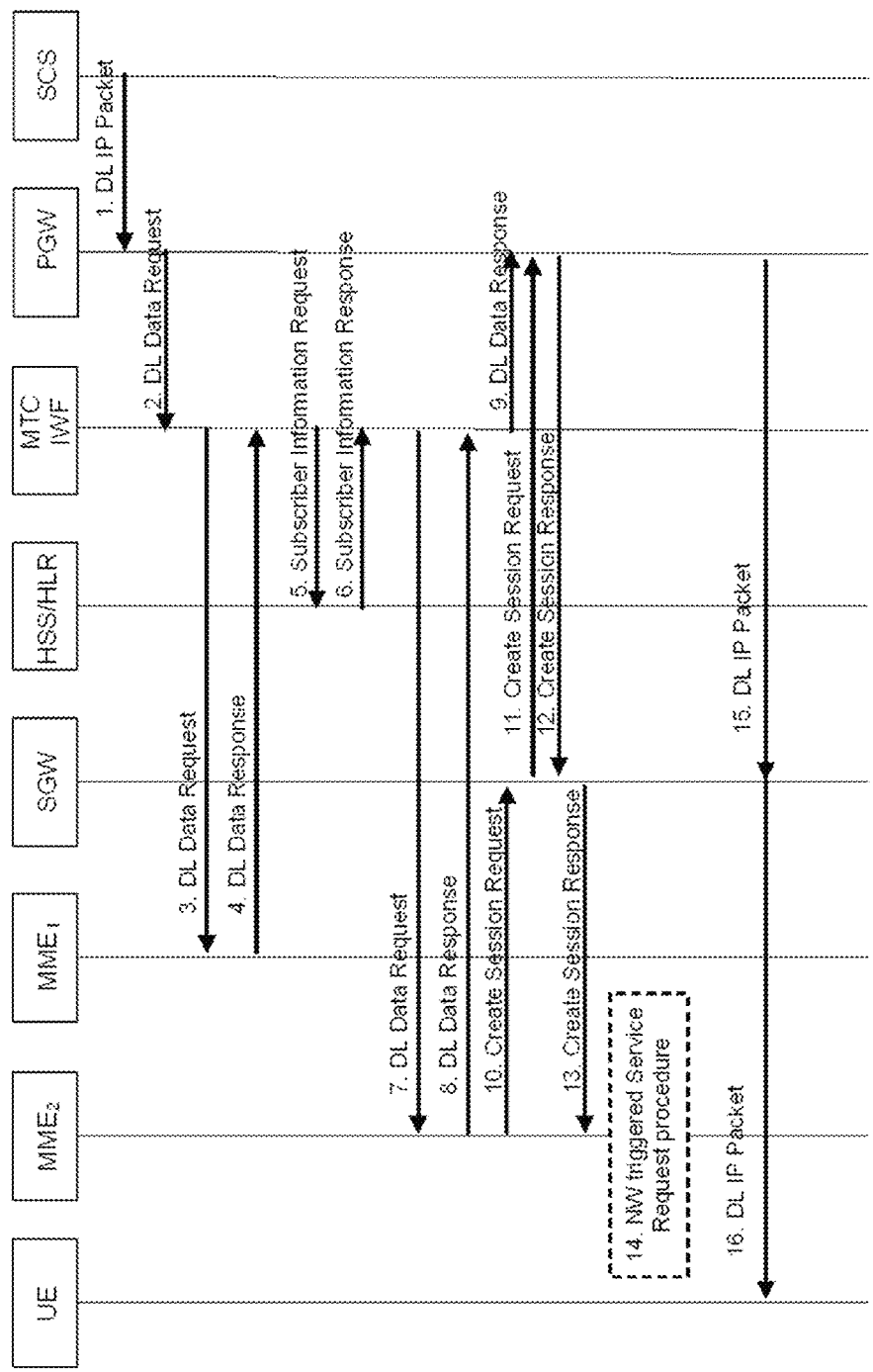

FIG. 5 illustrates another non-limiting example of a messaging diagram feature some of the example embodiments described herein. It should be appreciated that the example provided in FIG. 4 is with respect to an E-UTRAN based system, however, the example embodiments may also be applied to a GERAN or UTRAN based system.

In FIG. 5, a notification path via the MTC-IWF utilizes a new interface between the PGW and the MTC-IWF labeled "T11" (as shown in FIG. 3). The MTC-IWF may optionally find the serving MME, for example, by locally stored/cached serving MME information based on IMSI. The MTC-IWF then delivers the notification either via the T5b interface directly to the serving MME or it uses the T4 interface and delivers the notification as an SMS to the serving MME.

If the T5b interface is used the MTC-IWF may deliver the notification either as a "device trigger", for example, as described in 3GPP TS 23.682 v11.1.0, by which the MME will revoke the PDN connection and the M2M Device would be triggered. Alternatively the MTC-IWF may deliver the notification as a new notification using specific messages for notifying the MME on T5b. The M2M Device would not be affected in this case, but the user equipment or terminal device would be "triggered" when the buffered DL IP packet is received in the terminal device/user equipment.

If the MTC-IWF delivers via the T4 instead of T5b, the MTC-IWF sends the notification as a device trigger according to 3GPP TS 23.682 V11.1.0. The MME would then revoke the PDN Connection plus forward a device trigger to the user equipment. The user equipment would then move to a connected mode, for example, the user equipment will establish the radio bearers and the eNB-SGW (S1-U) tunnel. In one specific implementation, the MTC-IWF and T4 protocol would distinguish the "notification" from "device triggers" and the MME would not forward the T4 notification to the user equipment, but just re-establish the PDN connection, for example, comprising an optional network triggered Service Request Procedure, as described in step/message 14 below.

The different messages of FIG. 5 will be described below according to the message numbering.

Message 1

A downlink IP packet arrives in the PGW. The destination IP address does not have a corresponding GTP-U tunnel. The PGW checks the list of reserved IP addresses and finds a match. The IMSI and the latest known MME address and SGW address associated to the IP address are used to send a DL Data Request to the MTC-IWF. The PGW uses primarily its cached information about serving MME to avoid an excessive HSS/HLR load.

Message 2

The MTC-IWF receives the DL Data Request and forwards it on the T5b interface (alternatively via the T4 interface) to the MME address comprised in the DL Data Request message. A new information element may be comprised to indicate what service the received Downlink data belong to, in order to let the MME perform service aware paging in the later procedure, such service information may be retrieved by the PGW via a packet inspection function.

Message 3

The MME receives the DL Data Request message. The MME checks if it currently serves the terminal device/UE identified by the IMSI in the message. If it does, the sequence proceeds as of message/step 7. If it is not serving that IMSI, a DL Data Response message with a cause code may be returned. An example of the cause code may be "UE not in this MME".

Message 4

If the MTC-IWF receives a DL Data Response message with an error cause indicating that the user equipment (IMSI) is not served by that MME, for example, "UE not in this MME", the MTC-IWF queries the HSS/HLR to find the current serving MME. This query may use the S6m interface as in FIG. 3. The IMSI is comprised in the Subscriber Information Request.

Message 5

The HSS/HLR returns the current serving MME identity as a response to the Subscriber Information Request.

Message 6

The MTC-IWF resolves the MME identity to an MME GTPv2-C address using a DNS server. If this MME is different from the MME in message 2, the MTC-IWF sends a new DL Data Request to the MME on the T5b interface (alternatively via the T4 interface, as illustrated in FIG. 3).

Message 7

The MME receives the DL Data Request message. The MME checks that it currently serves the terminal device/UE identified by the IMSI in the message. The MME then triggers a re-establishment procedure as provided by steps/messages 10-13 to re-establish the PDN connection between the SGW and the PGW. The MME may also optionally already now trigger a network initiated service request procedure to establish the data path between the SGW and the eNB/UE. Alternatively that procedure will be triggered when the DL IP packet arrives in the SGW and the SGW sends a Downlink Data Notification to the MME (see clause 5.3.4.3 in 3GPP TS 23.401 v11.1.0).

Message 8

A DL Data Response message is sent back to the PGW via the MTC-IWF. Alternatively, the PGW may take the Create Session Request in step/message 11 as an acknowledgement of a successful DL Data Request.

Message 9

The MTC-IWF forwards the response to the PGW. If the MTC-IWF has retrieved a new serving MME from the HSS/HLR, the new serving MME is returned to the PGW in case of a future revocation or deletion of the PDN connection. According to some of the example embodiments, the MTC-IWF is kept stateless.

Messages 10-13

The DL Data Request message triggers a re-establishment procedure where the MME re-establishes the previously existing PDN connection by sending a Create Session Request comprising the reserved IP address to the same PGW as before. Information on which PGW was previously used may be stored in the context information in the MME.

Message 14

The MME optionally already now triggers a network initiated service request procedure (see clause 5.3.4.3 in 3GPP TS 23.401 v11.1.0) to move the UE to an EMM Connected mode, and to re-establish the data path from the SGW to the eNB and establish radio bearers to the UE. According to some of the example embodiments, this step may be performed now, instead as a result of step/message 15, in order to shorten the response time and save signaling, for example, DDN from SGW to MME.

Message 15

The PGW forwards the buffered DL IP packet on the newly created PDN connection towards to the terminal device/UE. This forwarding may optionally be delayed for a short time, for example, milliseconds to seconds, to ensure the PDN connection has been established in all nodes along the path. Especially, if the MME is configured to perform step/message 14 above, this delay can avoid an unnecessary DDN to be sent from SGW to the MME.

Message 16

The SGW forwards the DL packets to the eNB, if the eNB F-TEID for the user plane is already available, for example, the eNB F-TEID may be received in step/message 16. Otherwise, the SGW sends a Downlink Data Notification to the MME as part of Network Initiated Service Request procedure.

According to some of the example embodiments, a DL IP packet in the gateway node buffer (e.g., PGW or GGSN) may be passed to the terminal device. When the gateway node receives a Create Session Request for an IMSI or IP address which has a pending re-establishment, it creates the PDN Connection. When the PDN connection has been created and a response is sent back to, for example, the SGW, the PGW (gateway node) forwards the buffered DL IP packet on the newly created PDN connection towards to the user equipment or terminal device. This forwarding may optionally be delayed for a short time (milliseconds to second) to ensure the PDN connection has been established in all nodes along the path.

Figure 6:
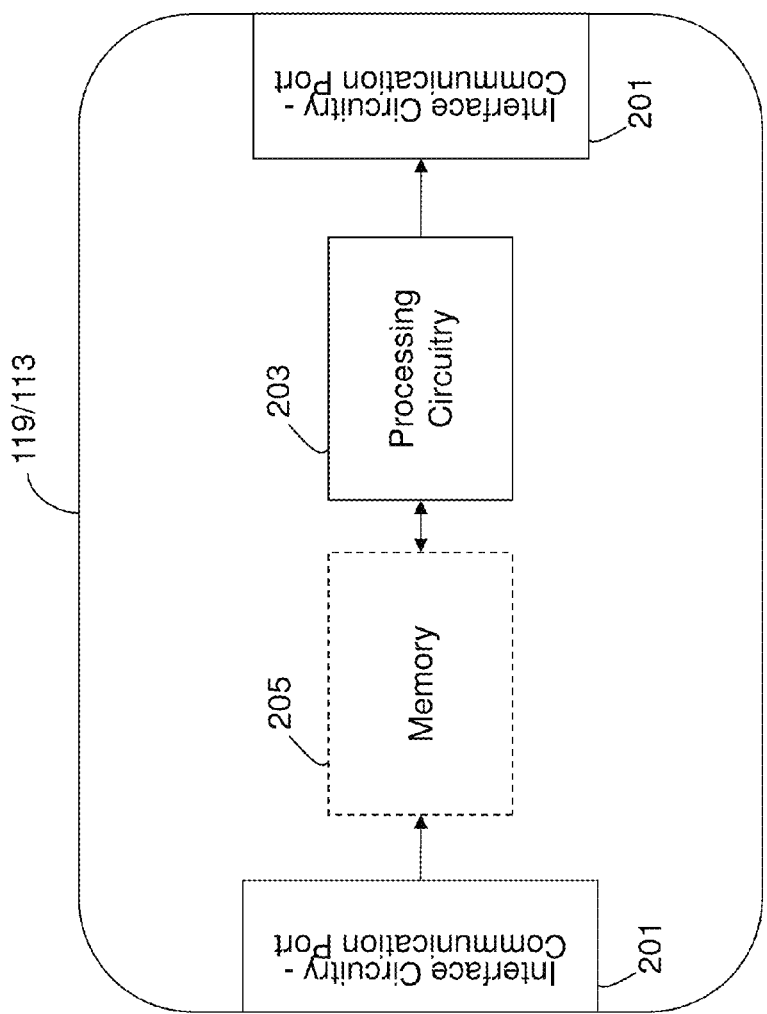
FIG. 6 is an example node configuration of a gateway node, according to some of the example embodiments presented herein.

FIG. 6 illustrates an example node configuration of a gateway node which may perform some of the example embodiments described herein. It should be appreciated that the gateway node may be a PGW 119 or a GGSN 113. The gateway node 113/119 may comprise interface circuitry or a communication port 201 that may be configured to receive and/or transmit communication data, instructions, and/or messages. It should be appreciated that the interface circuitry or communication port 201 may be comprised as any number of transceiving, receiving, and/or transmitting units or circuitry. It should further be appreciated that the interface circuitry or communication 201 may be in the form of any input/output communications port known in the art. The interface circuitry or communication 201 may comprise circuitry to handle the particular physical layer used on the interface e.g. optical circuitry or interface circuitry (not shown).

The gateway node 113/119 may also comprise a processing unit or circuitry 203 which may be configured to determine or retrieve information related to a revoked PDN/PDP connection. The processing circuitry 203 may be any suitable type of computation unit, e.g. a microprocessor, digital signal processor (DSP), field programmable gate array (FPGA), or application specific integrated circuit (ASIC), or any other form of circuitry. The gateway node 113/119 may further comprise a memory unit or circuitry 205 which may be any suitable type of computer readable memory and may be of volatile and/or non-volatile type. The memory 205 may be configured to store received, transmitted, and/or measured data, device parameters, communication priorities, and/or executable program instructions.

Figure 7:
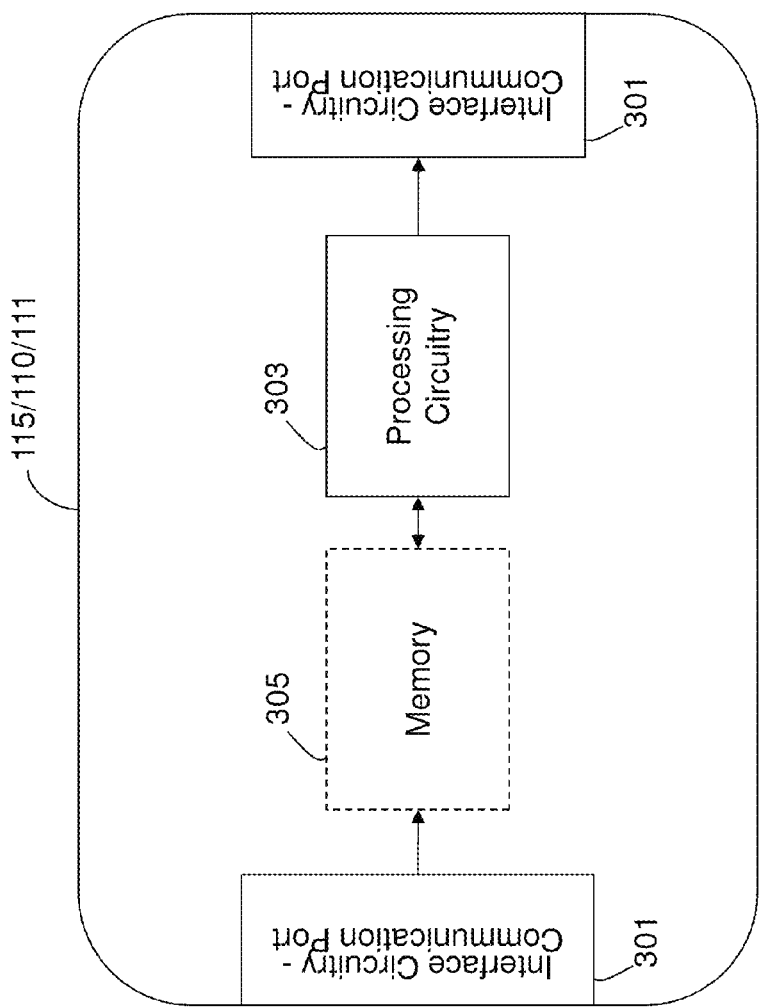
FIG. 7 is an example node configuration of a mobility management node, according to some of the example embodiments presented herein.

FIG. 7 illustrates an example node configuration of a mobility management node. It should be appreciated that the mobility management node may be a MME 115, a SGSN 111 of a S4-SGSN 110 which may perform some of the example embodiments described herein. The mobility management node 110/111/115 may comprise interface circuitry or a communication port 301 that may be configured to receive and/or transmit communication data, instructions, and/or messages. It should be appreciated that the interface circuitry or communication port 301 may be comprised as any number of transceiving, receiving, and/or transmitting units or circuitry. It should further be appreciated that the interface circuitry or communication 301 may be in the form of any input/output communications port known in the art. The interface circuitry or communication 301 may comprise circuitry to handle the particular physical layer used on the interface e.g. optical circuitry or interface circuitry (not shown).

The mobility management node 110/111/115 may also comprise a processing unit or circuitry 303 which may be configured to confirm or analyse information related to a deleted PDN/PDP connection. The processing circuitry 303 may be any suitable type of computation unit, e.g. a microprocessor, digital signal processor (DSP), field programmable gate array (FPGA), or application specific integrated circuit (ASIC), or any other form of circuitry. The mobility management node 110/111/115 may further comprise a memory unit or circuitry 305 which may be any suitable type of computer readable memory and may be of volatile and/or non-volatile type. The memory 305 may be configured to store received, transmitted, and/or measured data, device parameters, communication priorities, and/or executable program instructions.

Figure 8:
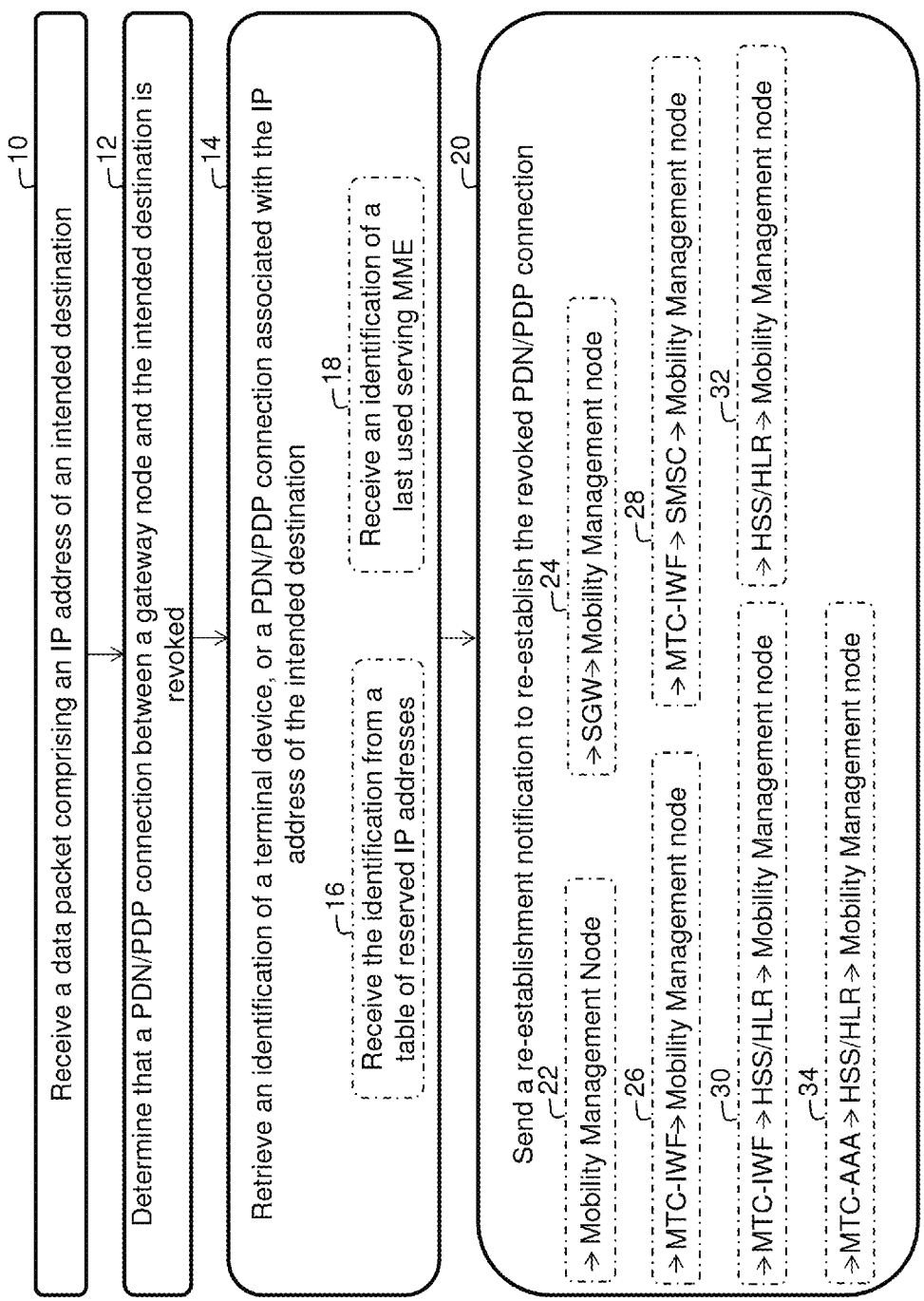
FIG. 8 is a flow diagram depicting example operations which may be taken by the gateway node of FIG. 6, according to some of the example embodiments presented herein.

FIG. 8 is a flow diagram depicting example operations which may be taken by the gateway node 113/119 of FIG. 6 for re-establishing a revoked (or deleted) PDP/PDN connection. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. It should further be appreciated that the example operations presented in FIG. 8 may be applied to a GERAN, UTRAN or E-UTRAN based system.

Operation 10

The gateway node 113/119 is configured to receive 10, from an application server, a data packet. The data packet comprises an IP address of an intended destination. The interface circuitry 201 is configured to receive, from an application server, the data packet.

According to some of the example embodiments, the application server may be a SCS, a MTC server, an MTC application, or an IEFT host.

Operation 12

The gateway node 113/119 is further configured to determine 12 that a PDP/PDN connection between the gateway node and the intended destination is revoked (or deleted). The processing circuitry 203 is configured to determine that the PDP/PDN connection between the gateway node and the intended destination is revoked or deleted.

According to some of the example embodiments, the gateway node may be a PGW and an associated mobility management node may be a MME or S4-SGSN. In such an instance, the revoked PDP/PDN connection is between the PGW and a SGW.

According to some of the example embodiments, the gateway node may be a GGSN and an associated mobility management node may be a SGSN. In such an instance, the revoked PDP/PDN connection is between the GGSN and the SGSN.

Operation 14

The gateway node 113/119 is further configured to retrieve 14 an identification of a terminal device, or a PDP/PDN connection, associated with the IP address of the intended destination. The processing circuitry 203 is configured to retrieve the identification of the terminal device, of the PDP/PDN connection, associated with the IP address of the intended destination.

According to some of the example embodiments, the terminal device may be a M2M device or a user equipment. According to some of the example embodiments, the retrieved identification is a IMSI, MSISDN, an external ID, or any other identifications which are associated PDN connections (e.g., IMSI+NSAPI, IMSI+EBI tuple or an IP address).

Example Operation 16

According to some of the example embodiments, the retrieving 14 may further comprise retrieving 16 the identification of the terminal device, or the PDP/PDN connection, from a table of reserved IP addresses. The processing circuitry 203 may be configured to retrieve the identification of the terminal device, or the PDP/PDN connection, from a table of reserved IP addresses. According to some of the example embodiments, the table may be located in the gateway node, a HSS, a HLR, a PCRF, an AAA or any other node in the network.

Example Operation 18

According to some of the example embodiments, the retrieving 14/16 may further comprise retrieving 18 an identification or address of a last used serving mobility management node (e.g., a MME, S4-SGSN, or a SGSN). The processing circuitry 203 may be configured to retrieve the identification or address of a last used serving mobility management node.

Operation 20

The gateway node 113/119 is further configured to send 20, to the mobility management node, a re-establishment notification to re-establish the revoked (or deleted) PDP/PDN connection. The interface circuitry 201 is configured to send, to the mobility management node, the re-establishment notification to re-establish the revoked (or deleted) PDP/PDN connection.

According to some of the example embodiments, the re-establishment notification is a DDN, a PGW Downlink Triggering Notification, a Device Trigger Request, a T5 Submit Request or a T4 Submit Trigger or other new notification request.

Example Operation 22

According to some of the example embodiments, the sending 20 may further comprise sending 22 the re-establishment notification directly to the mobility management node (e.g., MME, SGSN, or S4-SGSN). The interface circuitry 201 may be configured to send the re-establishment notification directly to the mobility management node.

Example Operation 24

According to some of the example embodiments, the sending 20 may further comprise sending 24 the re-establishment notification to a SGW. The SGW may thereafter forward the re-establishment notification to the mobility management node (e.g., MME or S4-SGSN). The interface circuitry 201 may be configured to send the re-establishment notification to the SGW.

Example Operation 26

According to some of the example embodiments, the sending 20 may further comprise sending 26 the re-establishment notification to a MTC-IWF. The MTC-IWF may thereafter forward the re-establishment notification to the mobility management node (e.g., MME, SGSN, S4-SGSN). The interface circuitry 201 may be configured to send the re-establishment notification to the MTC-IWF.

Example Operation 28

According to some of the example embodiments, the sending 20 may further comprise sending 28 the re-establishment notification to the MTC-IWF. The MTC-IWF may thereafter forward the re-establishment notification to a SMSC. The SMSC may thereafter forward the re-establishment notification to the mobility management node (e.g., MME, SGSN or S4-SGSN). The interface circuitry 201 may be configured to send the re-establishment notification to the MTC-IWF.

Example Operation 30

According to some of the example embodiments, the sending 20 may further comprise sending 30 the re-establishment notification to the MTC-IWF. The MTC-IWF may thereafter forward the re-establishment notification to a HSS or HLR. The HSS or HLR may thereafter forward the re-establishment notification to the mobility management node (e.g., MME, SGSN, S4-SGSN). The interface circuitry 201 may be configured to send the re-establishment notification to the MTC-IWF.

Example Operation 32

According to some of the example embodiments, the sending 20 may further comprise sending 32 the re-establishment notification to the HSS or HLR. The HSS or HLR may thereafter forward the re-establishment notification to the mobility management node (e.g., MME, SGSN, S4-SGSN). The interface circuitry 201 may be configured to send the re-establishment notification to the HSS or HLR.

Example Operation 34

According to some of the example embodiments, the sending 20 may further comprise sending 34 the re-establishment notification to a MTC-AAA. The MTC-AAA may thereafter forward the re-establishment notification to a HSS or HLR. The HSS or HLR may thereafter forward the re-establishment notification to the mobility management node. The interface circuitry 201 may be configured to send the re-establishment notification to the MTC-AAA.

Figure 9:
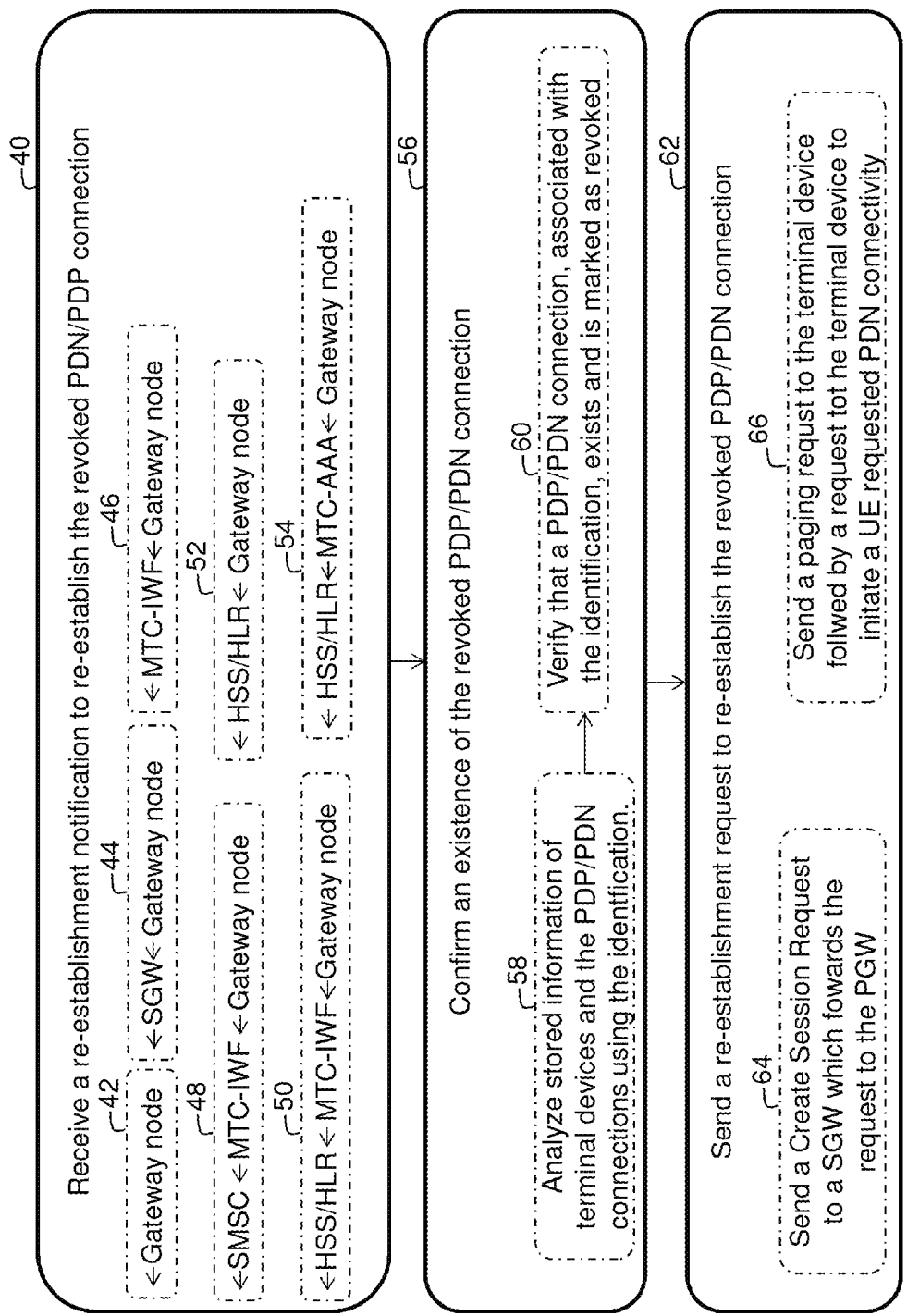
FIG. 9 is a flow diagram depicting example operations which may be taken by the mobility management node of FIG. 7, according to some of the example embodiments presented herein.

FIG. 9 is a flow diagram depicting example operations which may be taken by the mobility management node 110/111/115 of FIG. 7 for re-establishing a revoked (or deleted) PDP/PDN connection. It should also be appreciated that FIG. 9 comprises some operations which are illustrated with a darker border and some operations which are illustrated with a lighter border. The operations which are comprised in a darker border are operations which are comprised in the broadest example embodiment. The operations which are comprised in a lighter border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. It should further be appreciated that the example operations presented in FIG. 9 may be applied to a GERAN, UTRAN or E-UTRAN based system.

Operation 40

The mobility management node 110/111/115 is configured to receive 40, from a gateway node (e.g., PGW or GGSN), a re-establishment notification. The re-establishment notification comprises an identification of a terminal device, or a PDP/PDN connection, associated with an IP address of an intended destination of an IP packet. The interface circuitry 303 is configured to receive, from the gateway node, the re-establishment notification.

According to some of the example embodiments, the re-establishment notification is a DDN, a PGW Downlink Triggering Notification, a Device Trigger Request, a T5 Submit Request or a T4 Submit Trigger or other new message.

According to some of the example embodiments, the terminal device may be a M2M device or a user equipment. According to some of the example embodiments, the retrieved identification is an IMSI, MSISDN, an external ID, or any other identifications which are associated PDN connections (e.g., IMSI+NSAPI, IMSI+EBI tuple or an IP address).

Example Operation 42

According to some of the example embodiments, the receiving 40 may further comprise receiving 42 the re-establishment notification directly from the gateway node (e.g., PGW or GGSN). The interface circuitry 303 may be configured to receive the re-reestablishment notification directly from the gateway node.

Example Operation 44

According to some of the example embodiments, the receiving 40 may further comprise receiving 44 the re-establishment notification from a SGW. The SGW may receive the re-establishment notification from a PGW. The interface circuitry 303 may be configured to receive the re-establishment notification from the SGW.

Example Operation 46

According to some of the example embodiments, the receiving 40 may further comprise receiving 46 the re-establishment notification from a MTC-IWF. The MTC-IWF may receive the re-establishment notification from the gateway node (e.g., PGW or GGSN). The interface circuitry 303 may be configured to receive the re-establishment notification from the MTC-IWF.

Example Operation 48

According to some of the example embodiments, the receiving 40 may further comprise receiving 48 the re-establishment notification from a SMSC using the format of a Short Message. The SMSC may receive the re-establishment notification from a MTC-IWF. The MTC-IWF may receive the re-establishment notification from the gateway node (e.g., PGW or GGSN). The interface circuitry 303 may be configured to receive the re-establishment notification from the SMSC using the format of a Short Message.

Example Operation 50

According to some of the example embodiments, the receiving 40 may further comprise receiving 50 the re-establishment notification from a HSS or HLR. The HSS or HLR may receive the re-establishment notification from the MTC-IWF. The MTC-IWF may receive the re-establishment notification from the gateway node (e.g., PGW or GGSN). The interface circuitry 303 may receive the re-establishment notification from the HSS or HLR.

Example Operation 52

According to some of the example embodiments, the receiving 40 may further comprise receiving 52 the re-establishment notification from a HSS or HLR. The HSS or HLR may receive the re-establishment notification from the gateway node (e.g., PGW or GGSN). The interface circuitry 303 may be configured to receive the re-establishment notification from the HSS or HLR.

Example Operation 54

According to some of the example embodiments, the receiving 40 may further comprise receiving 54 the re-establishment notification from a HSS or HLR. The HSS or HLR may receive the re-establishment notification from a MTC-AAA. The MTC-AAA may receive the re-establishment notification form the gateway node (e.g., PGW or GGSN). The interface circuitry 303 may be configured to receive the re-establishment notification form the HSS or HLR.

Operation 56

The mobility management node 110/111/115 is further configured to confirm 56 an existence of the revoked PDP/PDN connection. The processing circuitry 303 is configured to confirm the existence of the revoked PDP/PDN connection.

According to some of the example embodiments, the gateway node is a PGW and the mobility management node is a MME or S4-SGSN. In such an instance, the revoked (or deleted) PDP/PDN connection is between the PGW and the SGW.

According to some of the example embodiments, the gateway node is a GGSN and the mobility management node is a SGSN. In such an instance, the revoked (or deleted) PDP/PDN connection is between the GGSN and the SGSN.

Example Operation 58

According to some of the example embodiments, the confirming 56 may further comprise analysing 58 stored information of terminal device and its PDP/PDN connections using the identification of the terminal device, and/or the PDP/PDN connection, as an index. The processing circuitry 303 may be configured to analyse the stored information of the terminal device and its PDP/PDN connections using the identification of the terminal device, and/or the PDP/PDN connection, as an index.

According to some of the example embodiments, the stored information may be located in the mobility management node (e.g., MME, SGSN, S4-SGSN), a HSS, a HLR, a PCRF, a gateway node (e.g., PGW, GGSN), or any other node in the network. According to some of the example embodiments, the node may comprise a mobility management context.

Example Operation 60

According to some of the example embodiments, the confirming 56 and/or analysing 58 may further comprise verifying 60 that a PDP/PDN connection, associated with the identification, exists and is marked as revoked (or deleted). The processing circuitry 303 may verify that the PDP/PDN connection, associated with the identification, exists and is marked as revoked (or deleted).

Operation 62

The mobility management node 110/111/115 is also configured to send, to the gateway node or the terminal device, a re-establishment request to re-establish the revoked (or deleted) PDP/PDN connection. The interface circuitry is configured to send, to the gateway node or the terminal device, the re-establishment request to re-establish the revoked (or deleted) PDP/PDN connection.

Example Operation 64

According to some of the example embodiments, the re-establishment request may be a Create Session Request and the sending 62 may further comprise sending 64 the Create Session Request to a SGW. The SGW may forward the Create Session Request to a PGW. The interface circuitry 301 may be configured to send the Create Session Request to the SGW.

Example Operation 66

According to some of the example embodiments, the re-establishment request is a paging request and the sending 62 further comprises sending 66 the paging request to the terminal device followed by a request to the terminal device to initiate a UE Requested PDN Connectivity. The interface circuitry 301 is configured to send the paging request to the terminal device via the eNB followed by the request to the terminal device to initiate a UE Requested PDN Connectivity.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method in a gateway node, for re-establishing a revoked Packet Domain Protocol/Packet Data Network (PDP/PDN) connection, the gateway node being comprised in a wireless network the method comprising;
   receiving from an application server a data packet said data packet comprising an Internet Protocol (IP) address of an intended destination;

determining that a PDP/PDN connection between the gateway node and the intended destination is revoked;
retrieving an identification of a terminal device or a PDP/PDN connection associated with the IP address of the intended destination; and
sending, to a mobility management node, a re-establishment notification to re-establish the revoked PDP/PDN connection, wherein the sending further comprises sending the re-establishment notification to a Machine Type Communication-InterWorking Function (MTC-IWF), wherein the MTC-IWF thereafter forwards the re-establishment notification to the mobility management node.

2. A method in a gateway node for re-establishing a revoked Packet Domain Protocol/Packet Data Network (PDP/PDN) connection the gateway node being comprised in a wireless network the method comprising;
receiving from am application server a data packet said data packet comprising an Internet Protocol (IP) address of an intended destination;
determining that a PDP/PDN connection between the gateway node and the intended destination is revoked;
retrieving an identification of a terminal device or a PDP/PDN connection associated with the IP address of the intended destination; and
sending to a mobility management node a re-establishment notification to re-establish the revoked PDP/PDN connection, wherein the sending further comprises sending the re-establishment notification to a Machine Type Communication-InterWorking Function (MTC-IWF), wherein the MTC-IWF thereafter forwards the re-establishment notification to a Short Message Service Center (SMSC), and said SMSC forwards the re-establishment notification to the mobility management node.

3. A method in a gateway node for re-establishing a revoked Packet Domain Protocol/Packet Data Network (PDP/PDN) connection the gateway node being comprised in a wireless network the method comprising;
receiving from an application server a data packet said data packet comprising an Internet Protocol (IP) address of an intended destination;
determining that a PDP/PDN connection between the gateway node and the intended destination is revoked;
retrieving an identification of a terminal device or a PDP/PDN connection associated with the IP address of the intended destination; and
sending to a mobility management node a re-establishment notification to re-establish the revoked PDP/PDN connection, wherein the sending further comprises sending the re-establishment notification to a Machine Type Communication-InterWorking Function (MTC-IWF), wherein the MTC-IWF thereafter forwards the re-establishment notification to a Home Subscriber Server (HSS) or a Home Location Register (HLR), and said HSS or HLR forwards the re-establishment notification to the mobility management node.

4. A method, in a gateway node, for re-establishing a revoked Packet Domain Protocol/Packet Data Network (PDP/PDN)connection, the gateway node being comprised in a wireless network, the method comprising;
receiving, from an application server, a data packet. said data packet comprising an Internet Protocol (IP) address of an intended destination;
determining that a PDP/PDN connection between the gateway node and the intended destination is revoked;
retrieving an identification of a terminal device, or a PDP/PDN connection, associated with the IP address of the intended destination; and
sending, to a mobility management node, a re-establishment notification to re-establish the revoked PDP/PDN connection, wherein the sending further comprises
sending the re-establishment notification to a Home Subscriber Server (HSS) or a Home Location Register (HLR), and thereafter said HSS or HLR forwards the re-establishment notification to the mobility management node.

5. A method, in a gateway node, for re-establishing a revoked Packet Domain Protocol/Packet Data Network (PDP/PDN)connection, the gateway node being comprised in a wireless network, the method comprising;
receiving, from an application server, a data packet, said data packet comprising an Internet Protocol (IP) address of an intended destination;
determining that a PDP/PDN connection between the gateway node and the intended destination is revoked;
retrieving an identification of a terminal device or a PDP/PDN connection associated with the IP address of the intended destination; and
sending, to a mobility management node, a re-establishment notification to re-establish the revoked PDP/PDN connection, wherein the sending further comprises sending the re-establishment notification to a Machine Type Communication Authentication, Authorization and Accounting (MTC-AAA), wherein the MTC-AAA thereafter forwards the re-establishment notification to a Home Subscriber Server (HSS) or a Home Location Register (HLR), and said HSS or HLR forwards the re-establishment notification to the mobility management node.

6. A method, in a mobility management node, for re-establishing a revoked Packet Domain Protocol/Packet Data Network (PDP/PDN) connection, the method comprising;
receiving from a gateway node, a re-establishment notification, said re-establishment notification comprising an identification of a terminal, or a PDP/PDN connection, associated with an Internet Protocol (IP) address of an intended destination of an IP packet, wherein the receiving further comprises receiving the re-establishment notification from a Machine Type Communication-InterWorking Function (MTC-IWF), wherein the MTC-IWF receives the re-establishment notification from the gateway node;
confirming an existence of the revoked PDP/PDN connection; and
sending, to the gateway node or the terminal device, a re-establishment request to re-establish the revoked PDP/PDN connection.

7. A method in a mobility management node, for re-establishing a revoked Packet Domain Protocol/Packet Data Network (PDP/PDN) connection, the method comprising;
receiving from a gateway node, a re-establishment notification said re-establishment notification comprising an identification of a terminal device, or a PDP/PDN connection, associated with an Internet Protocol (IP) address of an intended destination of an IP packet, wherein the receiving further comprises receiving the re-establishment notification from a Short Message Service Center (MSC) using a format of a Short Message, wherein the SMSC receives the re-establishment notification from a Machine Type Communication-Inter- Working Function (MTC-IWF), and said MTC-IWF receives the re-establishment notification from the gateway node;
confirming an existence of the PDP/PDN connection; and
sending, to the gateway node or the terminal device, a re-establishment request to re-establish the revoked PDP/PDN connection.

8. A method in a mobility management node, for re-establishing a revoked Packet Domain Protocol/Packet Data Network (PDP/PDN) connection, the method comprising;
receiving from a gateway node, a re-establishment notification, said re-establishment notification comprising an identification of a terminal device, or PDP/PDN connection, associated with an Internet Protocol (IP) address of an intended destination of an IP packet, wherein the receiving further comprises receiving the re-establishment notification from a Home Subscriber Server (HSS) or a Home Location Register (HLR), wherein said HSS or HLR receives the re-establishment notification from a Machine Type Communication-InterWorking Function (MTC-IWF), and said MTC-IWF receives the re-establishment notification from the gateway node;
confirming an existence of the revoked PDP/PDN connection; and
sending to the gateway node or the terminal device, a re-establishment request to re-establish the revoked PDP/PDN connection.

9. A method in a mobility management node, for re-establishing a revoked Packet Domain Protocol/Packet Data Network (PDP/PDN) connection, the method comprising;
receiving from a gateway node, a re-establishment notification said re-establishment notification comprising an identification of a terminal device or a PDP/PDN connection, associated with an Internet Protocol (IP) address of an intended destination of an IP packet, wherein the receiving further comprises receiving the re-establishment notification from a Home Subscriber Server (HSS) or a Home Location Register (HLR), and said HSS or HLR receives the re-establishment notification from the gateway node;
confirming an existence of the revoked PDP/PDN connection; and
sending to the gateway node or the terminal device, a re-establishment request to re-establish the revoked PDP/PDN connection.

10. A method in a mobility management node, for re-establishing a revoked Packet Domain Protocol/Packet Data Network (PDP/PDN) connection, the method comprising;
receiving from a gateway node, a re-establishment notification said re-establishment notification comprising an identification of a terminal device, or a PDP/PDN connection, associated with an Internet Protocol (IP) address of an intended destination of an IP packet, wherein the receiving further comprises receiving the re-establishment notification from a Home Subscriber Server (HSS) or a (HLR), wherein said HSS or HLR receives the re-establishment notification from a Machine Type Communication- Authentication, Authorization and Accounting (MTC-AAA), and said MTC-AAA receives the re-establishment notification from the gateway node;
confirming an existence of the revoked PDP/PDN connection; and
sending to the gateway node or the terminal device, a re-establishment request to re-establish the revoked PDP/PDN connection.

* * * * *